US008693413B2

(12) United States Patent
Kanazawa et al.

(10) Patent No.: US 8,693,413 B2
(45) Date of Patent: Apr. 8, 2014

(54) WIRELESS COMMUNICATION BASE STATION DEVICE, WIRELESS COMMUNICATION RELAY DEVICE, WIRELESS COMMUNICATION TERMINAL DEVICE, PACKET RETRANSMISSION METHOD, AND WIRELESS COMMUNICATION SYSTEM

(75) Inventors: Takeshi Kanazawa, Kanagawa (JP); Ayako Horiuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 708 days.

(21) Appl. No.: 12/866,694

(22) PCT Filed: Feb. 6, 2009

(86) PCT No.: PCT/JP2009/000464
§ 371 (c)(1),
(2), (4) Date: Aug. 6, 2010

(87) PCT Pub. No.: WO2009/098892
PCT Pub. Date: Aug. 13, 2009

(65) Prior Publication Data
US 2010/0322136 A1 Dec. 23, 2010

(30) Foreign Application Priority Data

Feb. 8, 2008 (JP) ................................. 2008-029400

(51) Int. Cl.
*H04W 4/00* (2009.01)
(52) U.S. Cl.
USPC ............................ 370/329; 714/749; 455/450
(58) Field of Classification Search
USPC ................. 370/312, 315, 329, 467, 252, 328; 714/790, 746–750; 455/450
See application file for complete search history.

(56) References Cited

U.S. PATENT DOCUMENTS 5,898,679 A 4/1999 Brederveld
(Continued)

FOREIGN PATENT DOCUMENTS

JP 10-215281 8/1998
JP 2004-15136 1/2004

OTHER PUBLICATIONS

3GPP TSG RAN WG2#58 R2-072074, "Report of email discussion of UE State during MBMS Reception (point 1)," Vodafone Group, May 11, 2007, pp. 1-10.
3GPP TSG RAN WG2#59bis R2-074331, "Conditional HARQ retransmission for single-cell MBMS," Alcatel-Lucent, Oct. 12, 2007, pp. 1-6.

(Continued)

*Primary Examiner* — Dang Ton
*Assistant Examiner* — Mandish Randhawa
(74) *Attorney, Agent, or Firm* — Dickinson Wright PLLC

(57) ABSTRACT

A wireless communication base station device capable of improving the reception quality of the MBMS data of UE without wasting wireless resources even if an error occurs in the MBMS data transmitted from an eNB when distributing the MBMS via a wireless access network composed of the eNB and an RS. In the device, a wireless quality determining section (162) outputs reception quality determination information indicating the reception quality between the UE and the device determined on the basis of a CQI included in the NACK signal received from the UE to a retransmission determining section (164). A retransmission data determining section (171) of the retransmission determining section (164) determines MBMS data to be retransmitted from the device and retransmission data (FEC encoding ratio of the MBMS data) to be retransmitted from the RS on the basis of the reception quality determination information inputted from the wireless quality determining section (162). The retransmission data determining section (171) notifies the RS of a request to relay the data including the FEC encoding ratio of the retransmission data to be retransmitted from the RS.

3 Claims, 13 Drawing Sheets

(56) References Cited

U.S. PATENT DOCUMENTS

| | | | | |
|---|---|---|---|---|
| 2001/0037485 | A1* | 11/2001 | Zhang | 714/790 |
| 2007/0245204 | A1* | 10/2007 | Yomo et al. | 714/749 |
| 2008/0101275 | A1* | 5/2008 | Kang et al. | 370/315 |
| 2008/0298387 | A1* | 12/2008 | Lohr et al. | 370/467 |
| 2012/0188966 | A1* | 7/2012 | Nishio | 370/329 |

OTHER PUBLICATIONS

Draft IEEE Standard for Local and metropolitan area networks, "Part 16: Air Interface for Fixed and Mobile Broadband Wireless Access Systems, Multihop Relay Specification," Relay Task Group of IEEE 802.16, 2007, pp. 1-226, p. 4, line 15.

International Search Report dated Mar. 3, 2009.

\* cited by examiner

WIRELESS COMMUNICATION BASE STATION DEVICE, WIRELESS COMMUNICATION RELAY DEVICE, WIRELESS COMMUNICATION TERMINAL DEVICE, PACKET RETRANSMISSION METHOD, AND WIRELESS COMMUNICATION SYSTEM

TECHNICAL FIELD

The present invention relates to a radio communication base station apparatus, radio communication relay apparatus, radio communication terminal apparatus, packet retransmission method and radio communication system.

BACKGROUND ART

The IMT-Advanced (International Mobile Telecommunication Advanced) system is the fourth-generation mobile communication system evolved from the IMT-2000 system, and aims to provide improved mobile communication services.

In the IMT-Advanced system, it is presumed that a higher frequency band is allocated than in the IMT-2000 system. Accordingly, propagation loss in the IMT-Advanced system is significant compared to the IMT-2000 system, and, consequently, the cell coverage provided by one radio communication base station apparatus ("evolved Node B" or "eNB") may be limited. Therefore, at present, in US IEEE 802.16j, European WINNER Project, and so on, studies are underway to prove a radio communication relay apparatus to expand eNB cell coverage and improve performance of a radio communication terminal apparatus ("user equipment" or "UE") in a cell edge. Here, the radio communication relay apparatus studied in IEEE 802.16j is refereed to as "RS (Relay Station)."

In an eNB cell edge, radio waves from the nearest eNB are weak and it is not possible to expect a plurality of propagation paths (or paths) to be found, and therefore it is estimated that the SINR (Signal-to-Interference and Noise power Ratio) is also low. If the SINR is low, a modulation scheme with low transmission speed such as QPSK (Quadrature Phase Shift Keying) is adopted. However, by applying an RS to this radio wave environment, it is possible to provide radio waves of a strong electrical field to a UE that is located in an eNB cell edge, and improve the SINR. If the SINR is high, it is possible to adopt a high-order modulation scheme such as 16 QAM (16 Quadrature Amplitude Modulation) and 64 QAM (64 Quadrature Amplitude Modulation), and improve bit error performance. By this means, it is possible to reduce the number of times of error correction coding and perform communication using radio resources efficiently.

Also, in a general mobile communication system, ARQ (Automatic Repeat Request) is adopted where, when the receiving side receives packets with error, the transmitting side is requested to retransmit the packets. This ARQ is the technique of efficiently compensating packet error with less delay by performing retransmission processing of packet error, which occurs in a transmission period of communication lines, in the MAC layer of layer 2. In ARQ, the transmitting side attaches CRC (Cyclic Redundancy Check) bits for error detection to transmission data and transmits the result. The receiving side performs error detection by CRC bits attached to received data. Here, if packet error is not present in the received data, the receiving side feeds back the sequence number of that packet and an ACK (ACKnowledgement) signal to the transmitting side. By contrast, if packet error is present in the received data, the receiving side feeds back the sequence number of the packet in which error is detected, and a NACK (Negative ACKnowledgement) signal, and the transmitting side retransmits only that packet in which error is detected, to the receiving side. By this means, error that occurs in the transmission period is compensated.

Also, studies are underway to apply HARQ (Hybrid ARQ) combining ARQ and FEC (Forward Error Correction), to the IMT-Advanced system. Here, HARQ includes the chase combining method and IR (Incremental Redundancy) method.

The chase combining method is the technique of retransmitting the same packets upon retransmission as in the initial transmission and performing maximum ratio combining of the initial transmission packets and the retransmission packets to improve the SINR of received packets and reduce packet error efficiently. To be more specific, the transmitting side performs FEC coding and transmission of transmission data, and the receiving side performs FEC decoding processing of received data. Upon detecting packet error in the received data, the receiving side feeds back a NACK signal including the sequence number of the packets to the transmitting side and stores the packets in which error is detected, in a buffer (memory) of the receiving side. Next, the transmitting side retransmits the sequence number included in the feedback NACK signal to the receiving side, and the receiving side performs maximum ratio combining of the retransmitted packets and the packets (with error) stored in the buffer, and performs error correction again by FEC decoding processing.

Also, the IR method does not transmit all encoded data subjected to FEC coding upon the initial transmission, and sequentially transmits encoded data using puncturing processing (that punctures bits of encoded data to a data length in which the original bit sequence is reconfigurable in FEC decoding processing only by transmission). To be more specific, the IR method is the technique of efficiently compensating error by sequentially transmitting, on the transmitting side, encoded data punctured by puncturing processing (i.e. encoded data which is not transmitted) if the receiving side detects bit error.

Here, FIG. 1 shows an example of HARQ operations in the IMT-Advanced system.

First, upon directly transmitting data to the UE, the eNB transmits scheduling information indicating resource allocation information of DL (DownLink) data, to the UE and RS (step ("ST") 1). The eNB transmits data (of sequence number #1) to the UE and RS, using a radio resource block indicated by the scheduling information (ST 2).

The UE and RS perform FEC decoding processing of the data transmitted from the eNB (ST 3-1 and ST 3-2). Here, the UE receives data with packet error and therefore transmits a NACK signal including sequence number #1 of the data to the eNB (ST 4-1). Also, the RS receives data without error, and therefore transmits an ACK signal to the eNB and stores data #1 in a buffer (memory) (ST 4-2).

Upon receiving a NACK signal from the UE, the eNB checks whether or not to have received an ACK signal from the RS. Further, if the eNB has received an ACK signal from the RS, the eNB requests the RS to retransmit data of sequence number #1 (i.e. retransmission request (#1)) to the UE (ST 5).

The RS requested to retransmit the data of sequence number #1 in ST 5 transmits data #1 stored in the buffer in ST 3-2 to the UE (ST 6). The UE performs a packet combination of data #1 (with packet error) received from the eNB in ST 2 and data #1 received from the RS in ST 6 (ST 7), and then performs FEC decoding processing of the combined packets again.

By this means, the UE can obtain a diversity effect by receiving the same data from a plurality of apparatuses (i.e. the eNB and RS) in a mobile communication system. Thus, by using HARQ, it is expected to provide reliable communication.

In IEEE 802.16j, the above HARQ method is referred to as "RS-Assisted-HARQ."

Also, the IMT-Advanced system is predicted to support MBMS (Multimedia Broadcast/Multicast Service). Here, MBMS is a service developed for not only broadcasting multimedia data (hereinafter "MBMS data") but also for multicasting MBMS data to UE's subscribing to a corresponding service. For example, MBMS provides news channel, music channel, movie channel, and so on.

Non-Patent Document 1: IEEE P802.16j/D1 "Part 16: Air Interface for Fixed and Mobile Broadband Wireless Access Systems: Multihop Relay Specification", 2007-08

DISCLOSURE OF INVENTION

Problems to be Solved by the Invention

However, if the above HARQ method is applied to MBMS, the following problems arise.

In MBMS, by performing broadcast/multicast transmission of one packet in an eNB and RS, radio resources are effectively used. Also, NACK signals from a plurality of UE's may be fed back for one MBMS data. Also, a UE selects one cell (eNB or RS) based on the received quality of downlink transmission data, and therefore a case is possible where there are a UE that directly receives MBMS data from the eNB and a UE that receives MBMS data via the RS together, among UE's using MBMS.

In this case, in a case where the received quality of MBMS data from the eNB is high and a UE that is located outside the coverage area of the RS feeds back a NACK signal, even if the RS retransmits MBMS data, that UE cannot receive the retransmission data. Also, if the RS retransmits MBMS data, a UE, which is located in the coverage area of the RS and which provides no packet error, cannot obtain a packet combination gain, and therefore radio resources may be wasted. Also, in a case where there is a UE that is located outside the coverage area of the eNB and that can receive MBMS data only via the RS, the RS performs relay transmission of MBMS data, regardless of a retransmission request from the eNB. Therefore, a UE that is located in an area in which the coverage areas of the eNB and RS overlap, can receive MBMS data from the RS in addition to the eNB. Even though the UE can receive the same data from different apparatuses of the eNB and RS, if that UE transmits a NACK signal when received data contains error, signaling is wasted.

It is therefore an object of the present invention to provide a radio communication base station apparatus, radio communication relay apparatus, radio communication terminal apparatus, packet retransmission method and radio communication system for improving the received quality of MBMS data for UE's without wasting radio resources, even in a case where error occurs in MBMS data transmitted from an eNB upon distributing MBMS via a radio access network formed with eNB's and RS's.

Means for Solving the Problem

The radio communication base station apparatus of the present invention employs a configuration having: a transmitting section that transmits multimedia broadcast/multicast service (MBMS) data to a plurality of radio communication terminal apparatuses and a radio communication relay apparatus; a receiving section that receives a negative acknowledgement signal from the plurality of radio communication terminal apparatuses; a transmitting section that transmits first retransmission data retransmitted from the radio communication base station apparatus; and a reporting section that reports, to the radio communication relay apparatus, a retransmission request for transmitting, to the plurality of radio communication terminal apparatuses, second retransmission data retransmitted from the radio communication relay apparatus.

The packet retransmission method of the present invention includes: a transmitting step of transmitting multimedia broadcast/multicast service (MBMS) data to a plurality of radio communication terminal apparatuses and a radio communication relay apparatus; a receiving step of receiving a negative acknowledgement signal including channel quality information indicating channel quality between each of the plurality of radio communication terminal apparatuses and a subject apparatus, as a response signal, from the plurality of radio communication terminal apparatuses; a retransmission determining step of determining first retransmission data retransmitted from the subject apparatus and second retransmission data retransmitted from the radio communication relay apparatus; and a reporting step of reporting a retransmission request including structure information of the determined second retransmission data to the radio communication relay apparatus.

Advantageous Effect of Invention

According to the present invention, it is possible to improve the received quality of MBMS data for UE's without wasting radio resources, even in a case where error occurs in MBMS data transmitted from an eNB upon distributing MBMS via a radio access network formed with eNB's and RS's.

BEST MODE FOR CARRYING OUT THE INVENTION

Embodiments of the present invention will be explained below in detail with reference to the accompanying drawings. Also, explanation will be given below with the embodiments, based on radio access techniques standardized in 3GPP (3rd Generation Partnership Project) such as GPRS (General Packet Radio Service), UMTS (Universal Mobile Telecommunication System) and LTE (Long Term Evolution). However, the present invention is not limited to the radio access techniques standardized in 3GPP, and is equally applicable to radio access techniques adopting multi-hop relay according to IEEE 802.16j and so on.

Embodiment 1

Figure 1:
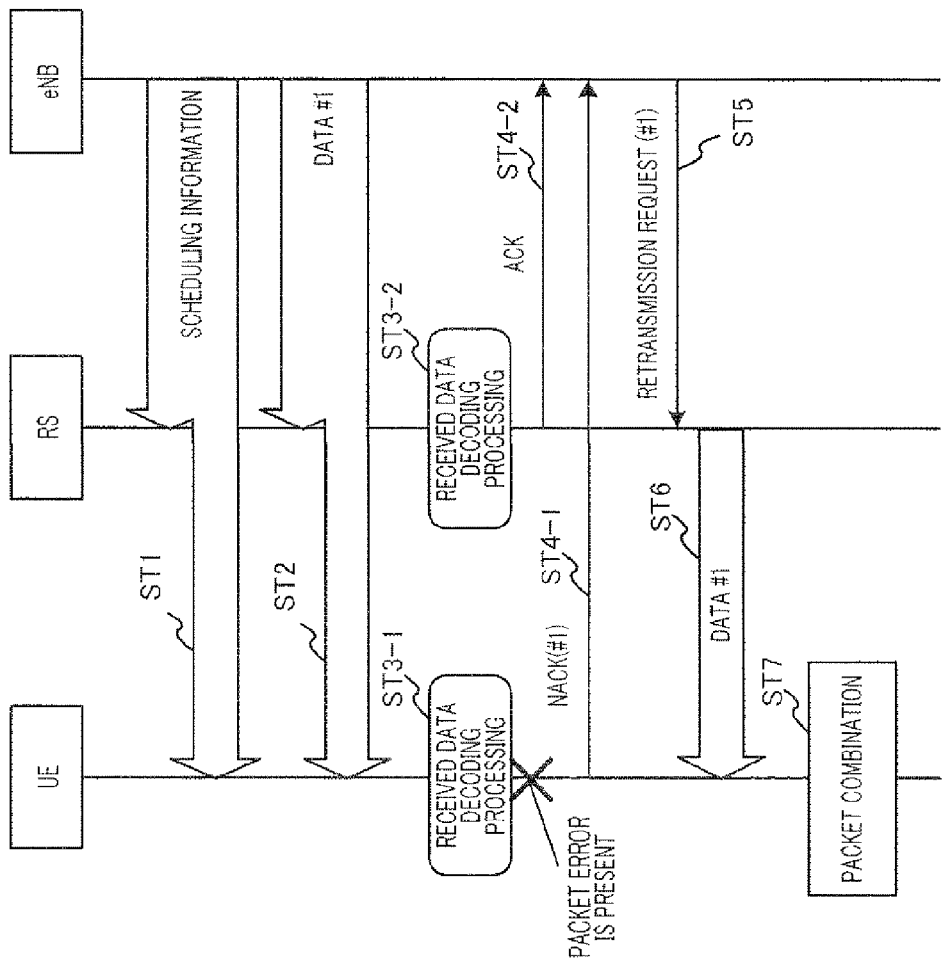
FIG. 1 is a sequence diagram showing conventional retransmission processing.
Figure 2:
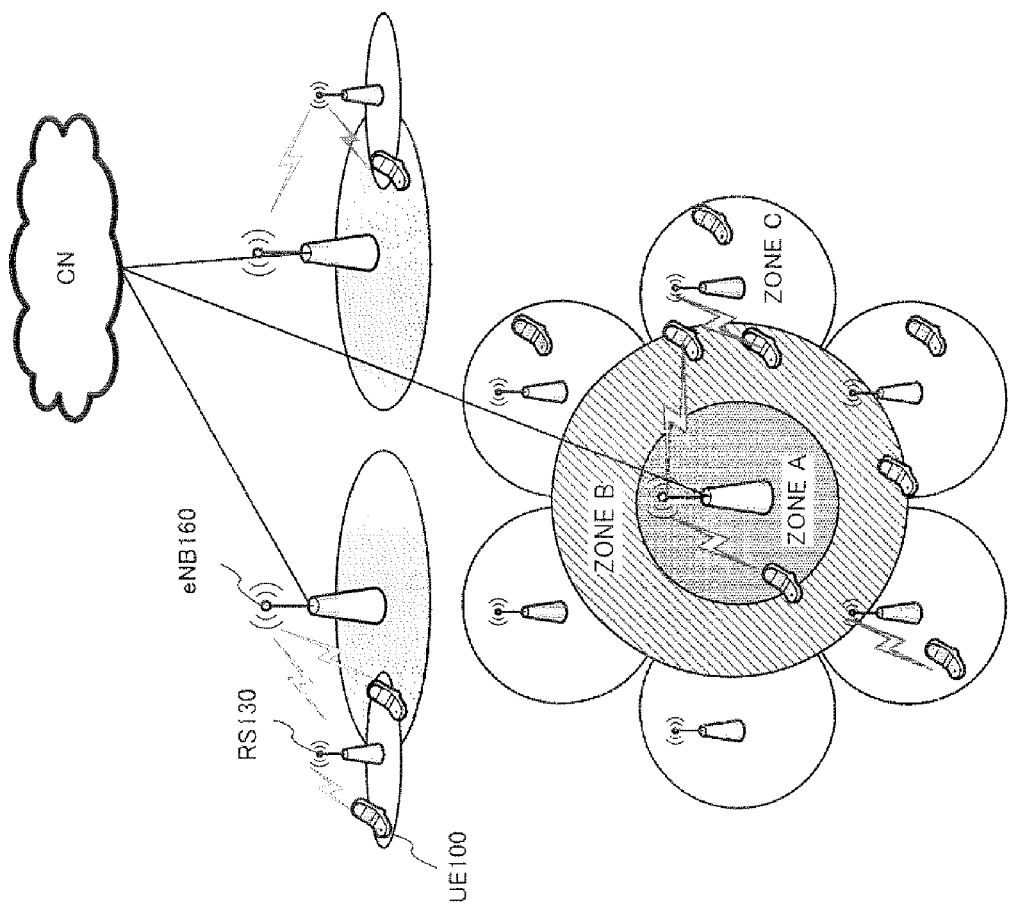
FIG. 2 shows the configuration of an IMT-Advanced system according to Embodiment 1 of the present invention.

FIG. 2 shows the configuration of an IMT-Advanced system according to the present embodiment. The IMT-Advanced system shown in FIG. 2 is provided with UE 100, RS 130, eNB 160 and CN ("Core Network").

In addition to allocation and management of radio resources, eNB 160 receives information transferred from a physical layer of UE 100 via UL (UpLink) and transfers data to UE 100 via downlink. That is, eNB 160 plays a role of an access point of a radio access network for UE 100.

RS 130 is provided to extend the service area of the IMT-Advanced system, and relays MBMS data received from eNB 160, to UE 100 that is located outside the coverage area of eNB 160. Downlink transmission data of RS 130 is scheduled in eNB 160, and scheduling information is reported to UE 100 via RS 130.

UE 100 communicates with CN via eNB 160 or RS 130, depending on the received quality of the downlink transmission data.

Figure 3:
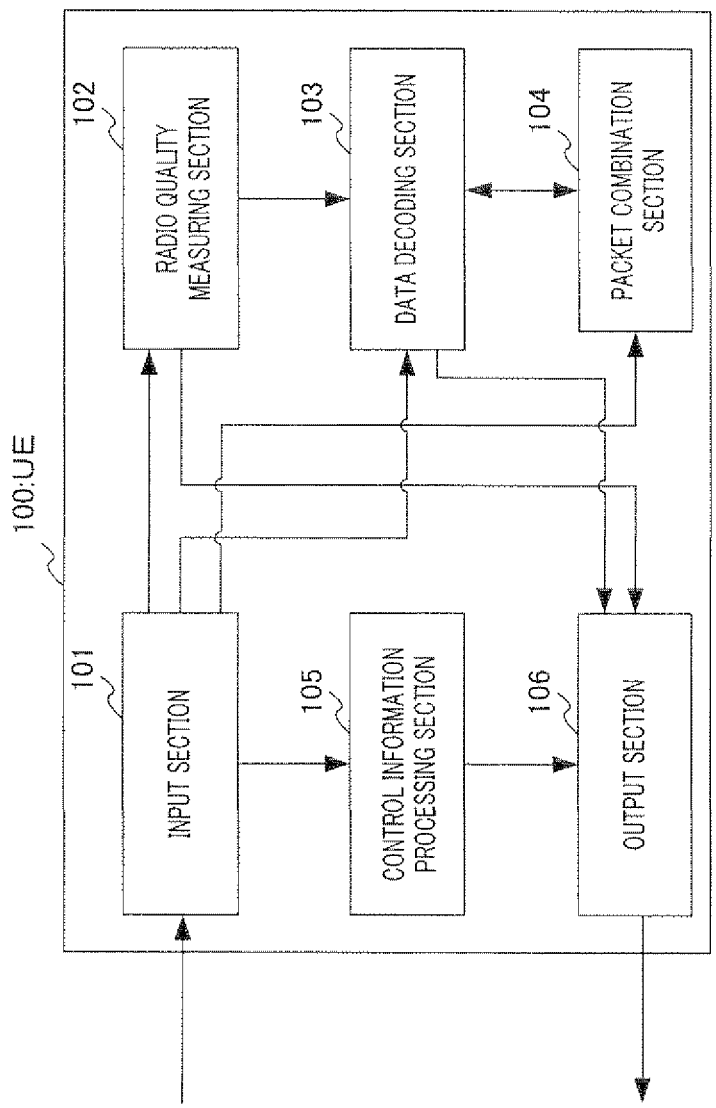
FIG. 3 is a block diagram showing the configuration of a UE according to Embodiment 1 of the present invention.

FIG. 3 is a block diagram showing the configuration of UE 100 shown in FIG. 2.

In FIG. 3, input section 101 receives as input scheduling information indicating radio resource allocation information of MBMS data, MBMS data, retransmission MBMS data, downlink CPICH (Common Pilot CHannel) included in physical layer information, and control information which is included in downlink control channels and indicates the MBMS service identifier, from eNB 160 and RS 130 via downlink. Further, input section 101 outputs the scheduling information and MBMS data to data decoding section 103, the CPICH to radio quality measuring section 102, the retransmission MBMS data to packet combination section 104 and the control information to control information processing section 105.

Radio quality measuring section 102 measures the SIR (Signal-to-Interference Ratio) using the CPICH received as input from input section 101, and generates a CQI (Channel Quality Index) indicating channel quality information, based on the measured SIR. That is, radio quality measuring section 102 measures the channel quality between eNB 160 and the subject apparatus, using the CPICH, which is a reference signal from eNB 160. The generated CQI is reported to data decoding section 103. Also, radio measuring section 102 measures the average received quality of downlink transmission data from RS 130, which is present near eNB 160 and the subject apparatus, and reports the measurement result to eNB 160 at regular intervals or at the time an event occurs (i.e. measurement report).

Data decoding section 103 performs FEC decoding processing of the MBMS data received as input from input section 101, and performs error detection for detecting whether or not packet error is present in the MBMS data. If packet error is not detected in the MBMS data, data decoding section 103 outputs an ACK signal to output section 106 as a response signal. By contrast, if packet error is detected in the MBMS data, first, data decoding section 103 specifies nearby RS 130 that can communicate with the subject apparatus, based on the measurement result received as input from radio quality measuring section 102. Next, based on the scheduling information received as input from input section 101, data decoding section 103 decides whether or not specified RS 130 transmits the same MBMS data as the MBMS data in which packet error is detected. That is, data decoding section 103 decides whether or not the scheduling information contains scheduling information of specified RS 130. Further, if it is decided that MBMS data is transmitted from RS 130 which can communicate with the subject apparatus (i.e. if the scheduling information contains scheduling information of specified RS 130), data decoding section 103 does not output a response signal to output section 106. By contrast, if it is decided that MBMS data is not transmitted from RS 130 which can communicate with the subject apparatus (i.e. if the scheduling information does not contain scheduling information of specified RS 130), data decoding section 103 outputs a NACK signal, which includes the sequence number of packets in which error is detected and the CQI received as input from radio quality measuring section 102, to output section 106 as a response signal.

Also, data decoding section 103 outputs the MBMS data in which packet error is detected, to packet combination section 104. Also, if MBMS data is transmitted, data decoding section 103 performs error detection again for combined MBMS data received as input from packet combination section 104. Further, if packet error is not detected, data decoding section 103 transmits an ACK signal to eNB 160 via output section 106, or, if packet error is detected again, transmits a NACK signal until the number of retransmissions reaches a predetermined number of repetitions, to request an MBMS data retransmission to eNB 160.

Packet combination section 104 performs packet combination of the MBMS data with packet error received as input from data decoding section 103 and the retransmission MBMS data received as input from input section 101, and outputs the combined MBMS data to data decoding section 103. Packet combination section 104 repeats packet combination of MBMS data until the number of retransmissions reaches a predetermined number of repetitions.

If the control information received as input from input section 101 contains the identifier of MBMS service which the subject apparatus wants to receive, control information processing section 105 outputs a service reception request for this MBMS service to output section 106.

Output section 106 transmits the measurement result received as input from radio quality measuring section 102 and a response signal (ACK signal or NACK signal) received as input from data decoding section 103, to eNB 160, and transmits the service reception request received as input from control information processing section 105, to RS 130.

Figure 4:
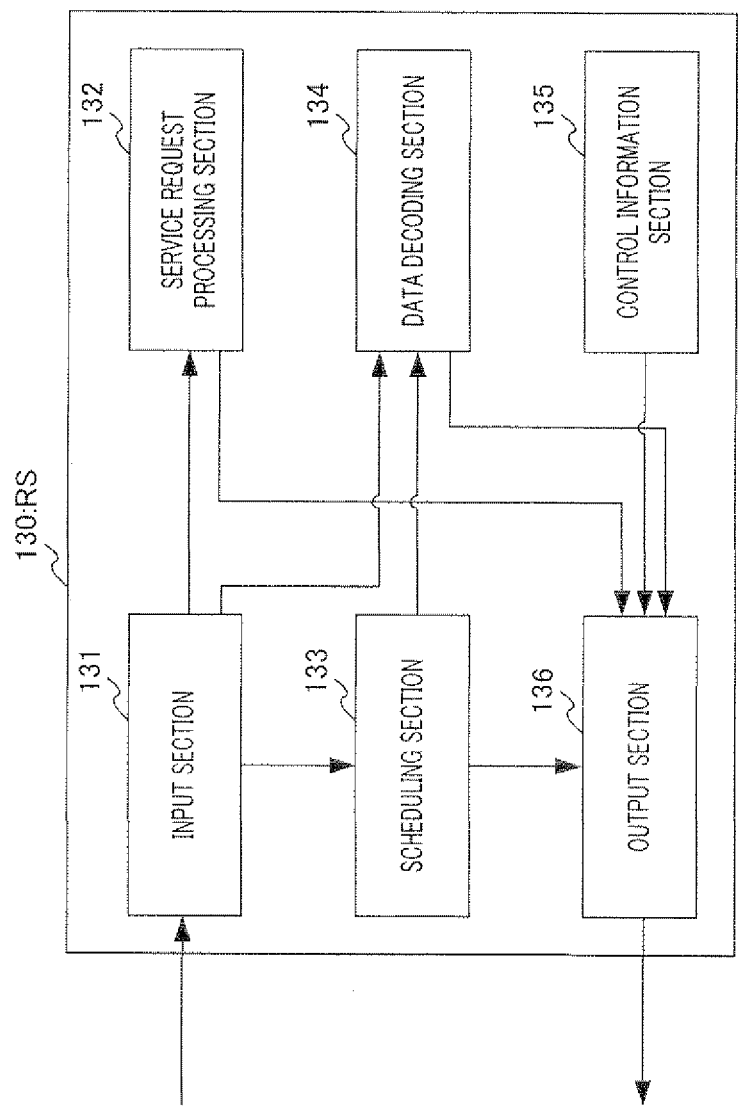
FIG. 4 is a block diagram showing the configuration of an RS according to Embodiment 1 of the present invention.

FIG. 4 is a block diagram showing the configuration of RS 130 shown in FIG. 2.

In FIG. 4, input section 131 outputs a service reception request transmitted from UE 100, to service request processing section 132. Also, input section 131 outputs MBMS data transmitted from eNB 160, to data decoding section 134, and outputs scheduling information and data relay request to scheduling section 133.

Upon receiving as input the service reception request from input section 131, service request processing section 132 outputs, to output section 136, an MBMS scheduling request for requesting scheduling such as radio resource allocation of MBMS data to eNB 160. Here, the MBMS scheduling request includes the identifier of MBMS service which UE 100 wants to receive.

Scheduling section 133 reports the transmission timing and transmission format of MBMS data to data decoding section 134, based on the scheduling information and data relay request received as input from input section 131. Also, scheduling section 133 outputs the scheduling information to output section 136.

Data decoding section 134 performs error detection by performing FEC decoding processing of the MBMS data received as input from input section 131. Here, if packet error is not detected in the MBMS data, data decoding section 134 stores this MBMS data in a buffer held in data decoding section 134. Also, upon receiving as input the transmission timing and transmission format of MBMS data from scheduling section 133, that is, upon receiving a notice of a retransmission request of MBMS data from eNB 160, data decoding section 134 outputs the stored MBMS data to output section 136.

Control information section 135 outputs control information including the identifier of transmittable MBMS service, to output section 136, based on predetermined information.

Output section 136 transmits the MBMS scheduling request received as input from service request processing section 132, to eNB 160. Further, output section 136 transmits the scheduling information received as input from scheduling section 133, the MBMS data received as input from data decoding section 134 and the control information received as input from control information section 135, to UE 100.

Figure 5:
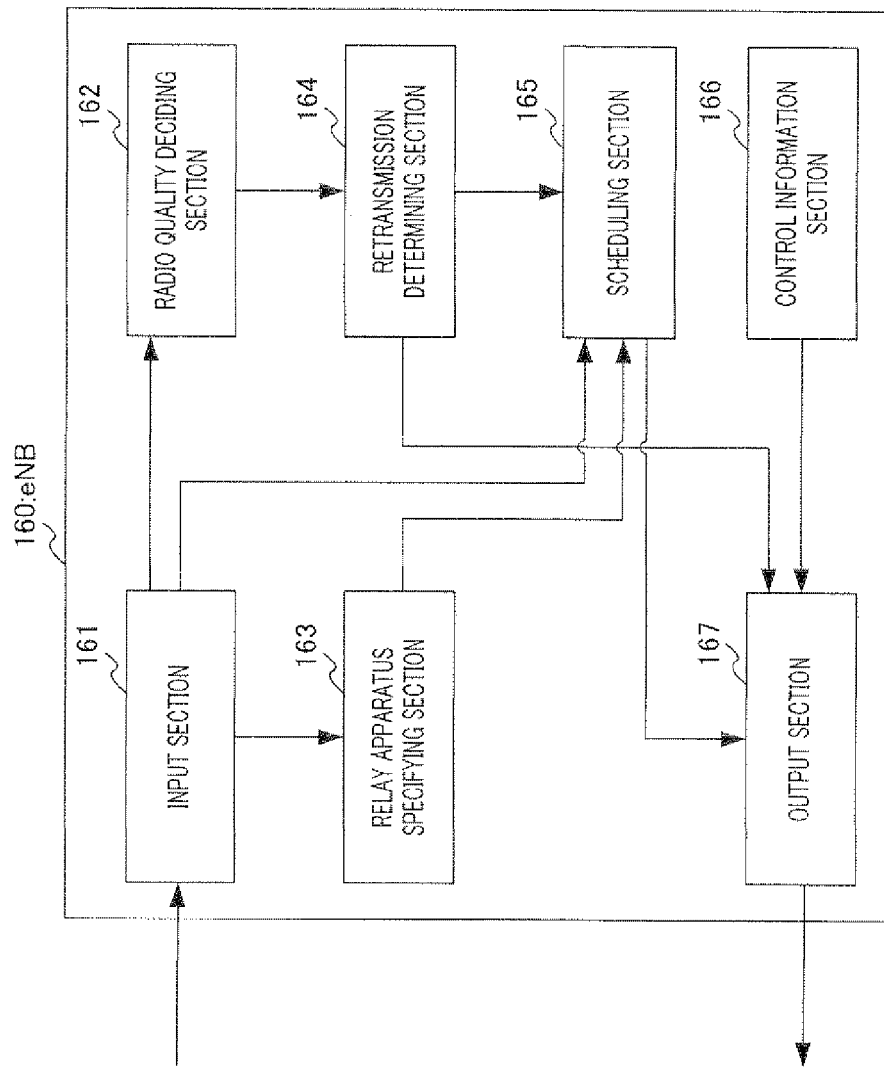
FIG. 5 is a block diagram showing the configuration of an eNB according to Embodiment 1 of the present invention.

FIG. 5 is a block diagram showing the configuration of eNB 160 shown in FIG. 2.

In FIG. 5, input section 161 outputs a measurement result transmitted from UE 100 and a CQI included in a NACK signal transmitted from UE 100, to radio quality deciding section 162. Further, input section 161 outputs an MBMS scheduling request transmitted from RS 130, to relay apparatus specifying section 163. Further, input section 161 outputs MBMS data received from CN, to scheduling section 165.

Based on the measurement result received as input from input section 161, radio quality deciding section 162 decides with what received quality UE 100 can receive signals from RS's 130 which are present near UE 100, and selects RS 130 of the highest received quality. Also, based on the CQI received as input from input section 161, radio quality deciding section 162 decides with what received quality UE 100 receives signals from the subject apparatus. Further, radio quality deciding section 162 outputs the identifier of selected RS 130 and received quality decision information indicating the decided, received quality between UE 100 and the subject apparatus, to retransmission determining section 164.

Based on the MBMS scheduling request received as input from input section 161, relay apparatus specifying section 163 specifies via which RS 130 MBMS data is relayed to UE 100 that requests reception of MBMS service. Further, relay apparatus specifying section 163 outputs the identifier of specified RS 130 to scheduling section 165.

Based on the received quality decision information received as input from radio quality deciding section 162 upon receiving a NACK signal from UE 100, retransmission determining section 164 determines whether the subject apparatus retransmits MBMS data or the RS retransmits MBMS data. To be more specific, if the received quality between UE 100 and the subject apparatus is high, that is, if the received quality decision information (CQI) is equal to or higher than a predetermined threshold, retransmission determining section 164 determines a retransmission of MBMS data by the subject apparatus. By contrast, if the received quality between UE 100 and the subject apparatus is low, that is, if the received quality decision information (CQI) is lower than a predetermined threshold, retransmission determining section 164 determines a retransmission of MBMS data by RS 130 indicated by the identifier received as input from radio quality deciding section 162. Further, retransmission determining section 164 outputs an identifier indicating an apparatus that performs retransmission (i.e. the subject apparatus or RS 130), to scheduling section 165. Also, upon determining a retransmission by RS 130, retransmission determining section 164 outputs, to output section 167, a data relay request for requesting a relay of MBMS data to that RS 130.

Scheduling section 165 stores the MBMS data received as input from input section 161 in the buffer held in scheduling section 165. Also, scheduling section 165 performs scheduling as to which radio resource the subject apparatus and RS 130 indicated by the identifier received as input from relay apparatus specifying section 163 use to transmit the MBMS data, and outputs scheduling information indicating the scheduling result to output section 167. Further, scheduling section 165 outputs the MBMS data to output section 167, based on the scheduling result for the subject apparatus.

Also, if MBMS data is retransmitted, upon receiving as input the identifier indicating the apparatus that performs retransmission (i.e. the subject apparatus or RS 130) from retransmission determining section 164, scheduling section 165 performs scheduling of retransmission MBMS data for that apparatus and outputs scheduling information to output section 167. Further, scheduling section 165 outputs the retransmission MBMS data to output section 167, based on the scheduling result.

Control information section 166 outputs control information including the identifier of transmittable MBMS service, to output section 167.

Output section 167 transmits the data relay request received as input from retransmission determining section 164, to RS 130. Further, output section 167 outputs the scheduling information and MBMS data received as input from scheduling section 165 and the control information received as input from control information section 166, to RS 130 and UE 100. Further, output section 167 transmits a CPICH to use to measure in UE 100 the channel quality between the subject apparatus and UE 100, to UE 100.

Figure 7:
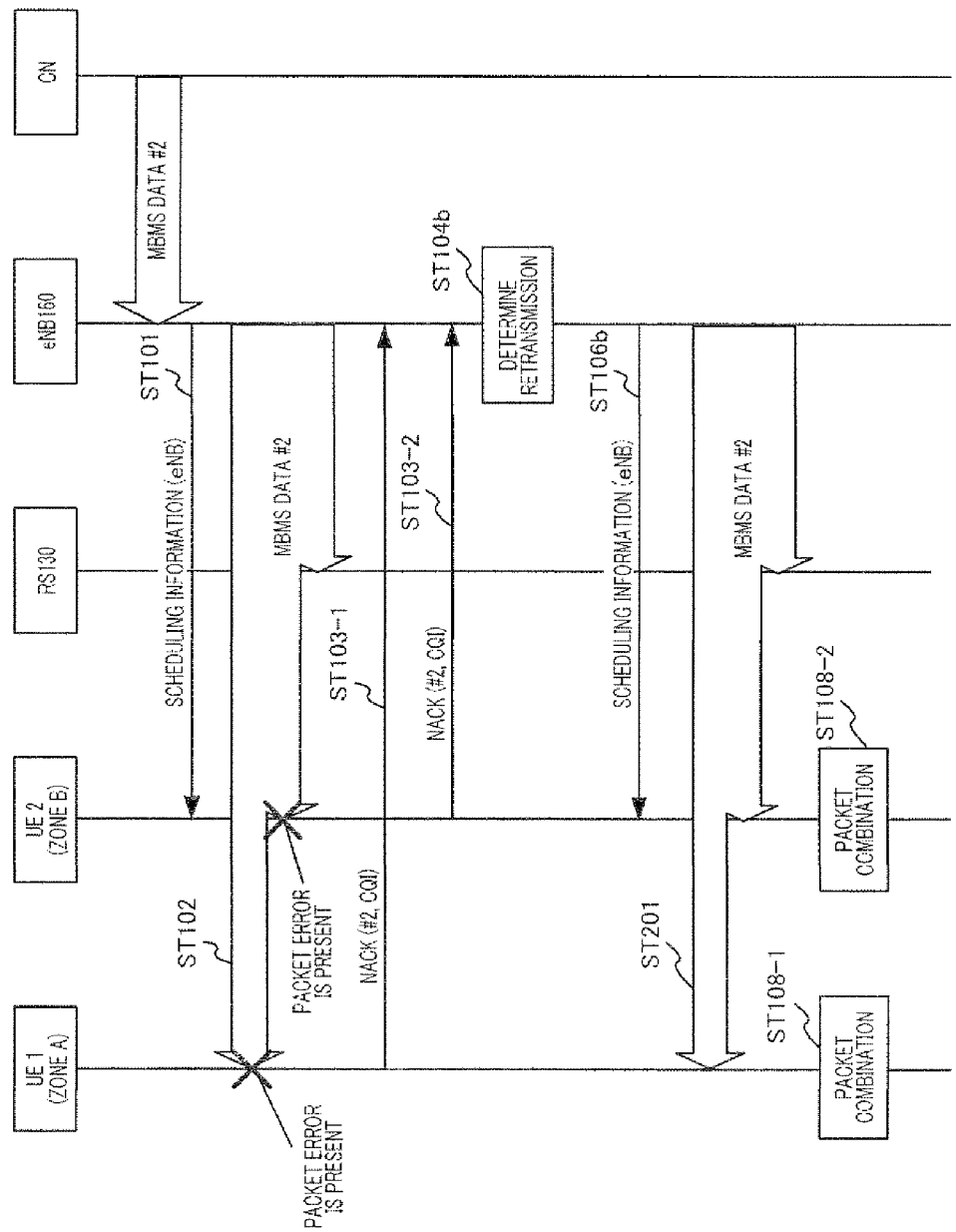
FIG. 7 is a sequence diagram showing retransmission processing according to Embodiment 1 of the present invention (retransmission example 2)
Figure 8:
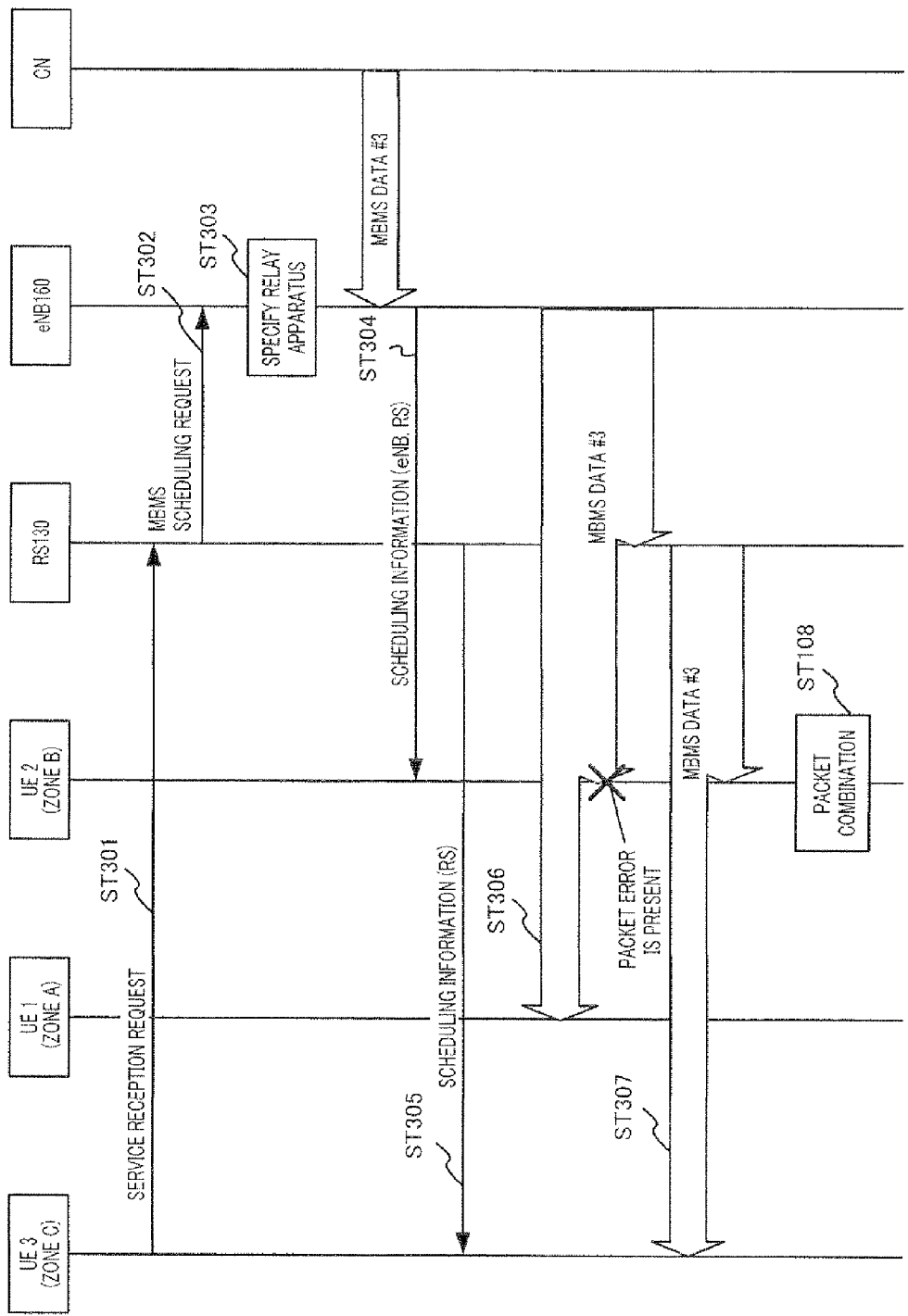
FIG. 8 is a sequence diagram showing retransmission processing according to Embodiment 1 of the present invention (retransmission example 3)

Next, the retransmission method of MBMS data transmitted from eNB 160 will be explained using FIGS. 6 to 8.

Here, as shown in FIG. 2, in the cell coverage of eNB 160, the range in which the CQI is equal to or higher than a threshold is referred to as "zone A," and the range in which the CQI is lower than the threshold is referred to as "zone B."

Also, the range outside the cell coverage of eNB 160 and inside the cell coverage of RS 130 is referred to as "zone C."

That is, UE 100 that is located in zone A can communicate only with eNB 160, UE 100 that is located in zone B can communicate with both eNB 160 and RS 130 because the cell coverage of eNB 160 and the cell coverage of RS 130 overlap in zone B, and UE 100 that is located in zone C can communicate with eNB 160 via RS 130.

Also, UE 100 that is located in zone A is referred to as "UE 1," UE 100 that is located in zone B is referred to as "UE 2," and UE 100 that is located in zone C is referred to as "UE 3."

Figure 6:
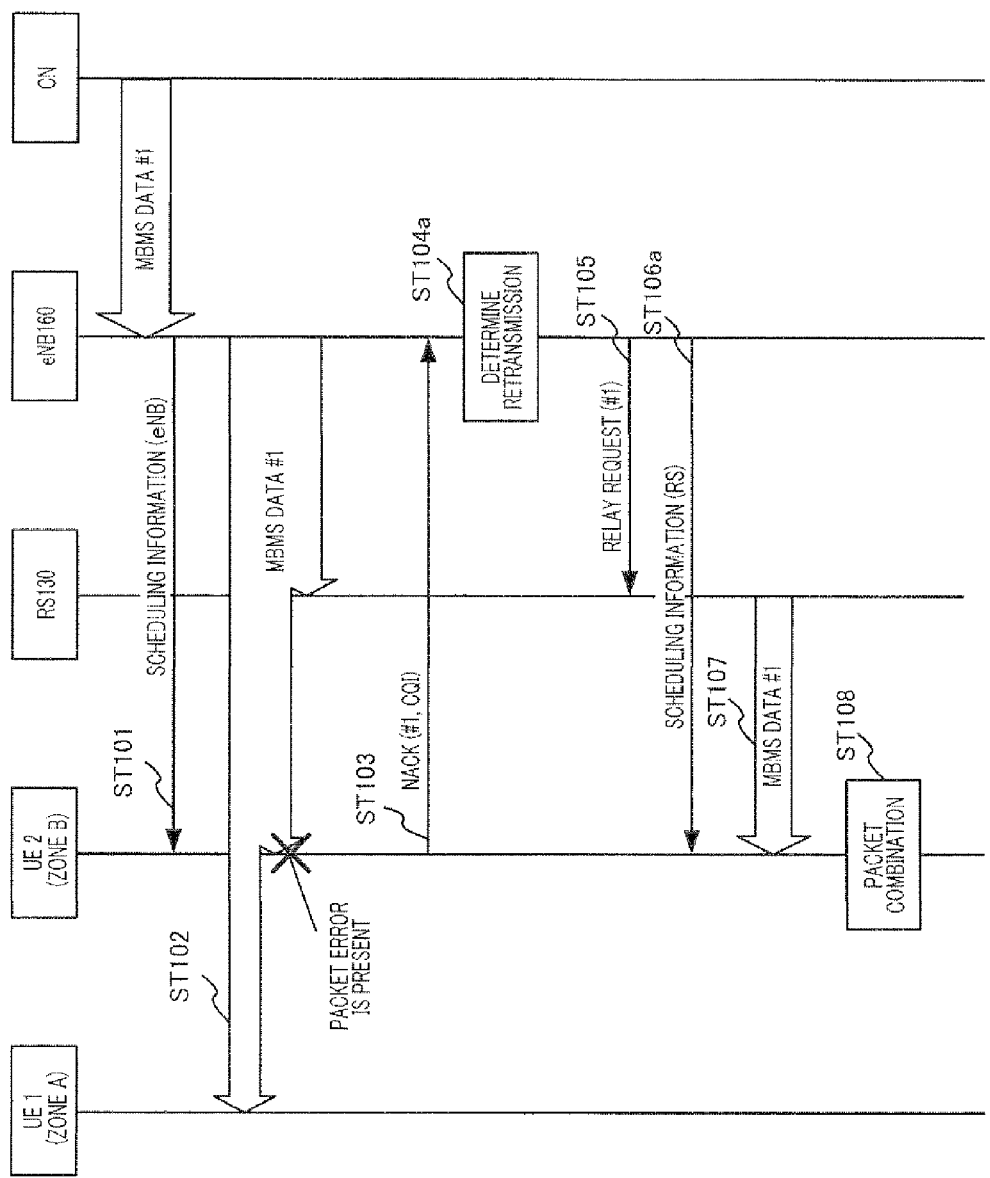
FIG. 6 is a sequence diagram showing retransmission processing according to Embodiment 1 of the present invention (retransmission example 1)

FIG. 6 is a sequence diagram showing the retransmission method of MBMS data for UE 2 that is located in zone B. In ST 101 in FIG. 6, eNB 160 broadcasts scheduling information (eNB) for MBMS service which UE 2 wants to receive. In ST 102, eNB 160 uses a radio resource indicated by the scheduling information to transmit MBMS data #1, and RS 130, UE 1 and UE 2 use the radio resource indicated by the scheduling information to receive MBMS data #1.

Here, assume that packet error is not detected in MBMS data #1 in RS 130 and UE 1. Therefore, RS 130 stores MBMS data #1 in a buffer, and UE 1 feeds back an ACK signal to eNB 160 (this process is not shown).

On the other hand, assume that packet error is detected in MBMS data #1 in UE 2. Therefore, in ST 103, in order to request a retransmission of MBMS data #1 to eNB 160, UP 2 feeds back a NACK signal including sequence number #1 of that MBMS data and a CQI indicating the channel quality between UE 2 and eNB 160 (i.e. NACK (#1, CQI)), to eNB 160.

In ST 104a, based on the CQI included in the NACK signal, eNB 160 decides that UE 2 which requested a retransmission is located in zone B. Also, the CQI from UE 2 is lower than a predetermined threshold, and, consequently, eNB 160 determines RS 130 that retransmits MBMS data #1 to UE 2, based on a measurement result transmitted from UE 2. In ST 105, eNB 160 transmits a relay request (#1) for requesting a relay of MBMS data #1 (retransmission) to determined RS 130, In ST 106a, eNB 160 broadcasts scheduling information (RS) indicating which radio resource RS 130 uses to relay MBMS data #1 (retransmission), to RS 130 and UE 2.

In ST 107, RS 130 transmits MBMS data #1 stored in the buffer in ST 102, using the radio resource broadcasted from eNB 160 in ST 106a.

In ST 108, UE 2 performs packet combination of MBMS data #1 (with packet error) received from eNB 160 in ST 102 and MBMS data #1 received from RS 130 in ST 107.

Next, the retransmission method for UE 1 that is located in zone A and UE 2 that is located in zone B, will be explained using FIG. 7.

Similar to FIG. 6, eNB 160 broadcasts scheduling information in ST 101 and transmits MBMS data #2 in ST 102. Here, assume that packet error is detected in MBMS data #2 in UE 1 and UE 2.

Therefore, in ST 103-1, in order to request a retransmission of MBMS data #2 to eNB 160, UE 1 feeds back a NACK signal including sequence number #2 of that MBMS data and a CQI indicating the channel quality between UE 1 and eNB 160 (i.e. NACK (#2, CQI)), to eNB 160. Similarly, in ST 103-2, UE 2 feeds back a NACK signal including sequence number #2 of that MBMS data and a CQI indicating the channel quality between UE 2 and eNB 160 (i.e. NACK (#2, CQI)), to eNB 160.

In ST 104b, from the CQI of each NACK signal, eNB 160 decides that UE 1 that is located in zone A and UE 2 that is located in zone B request a retransmission. Here, as shown in FIG. 2, UE 1 that is located in zone A is outside the cell coverage of RS 130. Therefore, eNB 160 decides that, if RS 130 retransmits MBMS data #2, UE 1 cannot perform diversity reception efficiently, and therefore eNB 160 determines that the subject apparatus retransmits MBMS data #2. As a result, in ST 106b, eNB 160 broadcasts scheduling information (eNB) indicating which radio resource eNB 160 uses to retransmit MBMS data #2, to UE 1 and UE 2.

In ST 201, eNB 160 transmits MBMS data #2 (retransmission) to UE 1 and UE 2. Next, UE 1 and UE 2 receive MBMS data #2 retransmitted from eNB 160, using the radio resource indicated by the scheduling information broadcasted in ST 106b. In ST 108-1 and ST 108-2, UE 1 and UE 2 perform packet combination of MBMS data #2 (with packet error) received from eNB 160 in ST 102 and MBMS data #2 received from eNB 160 in ST 201.

Thus, if UE 1, which provides the CQI equal to or higher than a predetermined threshold and which is located outside the coverage area of RS 130, requests a retransmission (i.e. if a NACK signal is received), eNB 160 determines to perform retransmission. By this means, UE 1 that is located in zone A can perform packet combination using retransmission data of higher received quality from eNB 160, so that it is possible to improve the received quality of MBMS data. Also, UE 2 that is located in zone B can perform packet combination using retransmission data from eNB 160. By this means, it is not necessary to retransmit retransmission data from RS 130, so that it is possible to reduce radio resources required for retransmission from RS 130.

Next, in a case where UE 3 that is located in zone C receives the same MBMS service as in UE 2 that is located in zone B, the method of improving the received quality for UE 2 that is located in zone B will be explained using FIG. 8.

In ST 301, UE 3 detects that MBMS service which UE 3 wants to receive is included as transmittable MBMS service in control information transmitted from RS 130, and transmits a service reception request to RS 130.

In ST 302, upon receiving the service reception request for MBMS service from UE 3, RS 130 transmits an MBMS scheduling request including the identifier of this MBMS service, to eNB 160.

In ST 303, upon receiving the MBMS scheduling request from RS 130, eNB 160 specifies via which RS 130 the MBMS data is relayed to UE 3. In ST 304, eNB 160 broadcasts scheduling information (eNB, RS) indicating which radio resource RS 130 that relays MBMS data to UE 3 uses to transmit MBMS data #3, to RS 130, UE 1 and UE 2. Also, in ST 305, RS 130 broadcasts scheduling information (RS) indicating which radio resource RS 130 uses to transmit MBMS data #3, to UE 3. In ST 306, UE 2 receives MBMS data #3 transmitted from eNB 160, using the radio resource indicated by the scheduling information (eNB, RS) in ST 304. Here, UE 2 detects that packet error is present in MBMS data #3. However, UE 2 detects from the scheduling information (eNB, RS) that RS 130 relays MBMS data #3 to UE 3 in ST 304. Also, in ST 305, UE 2 that is located in the cell coverage of RS 130 detects which resource RS 130 uses to transmit MBMS data #3. Therefore, even if packet error is present, UE 2 does not request a retransmission of MBMS data #3 to eNB 160. That is, UE 2 does not feed back a NACK signal (NACK (#3, CQI)).

In ST 307, UE 2 and UE 3 receive MBMS data #3 transmitted from RS 130 using the radio resource indicated by the scheduling information (RS) in ST 305. In ST 108, UE 2 performs packet combination of MBMS data #3 (with packet error) received from eNB 160 in ST 306 and MBMS data #3 received from RS 130 in ST 307. That is, UE 2 can receive the same MBMS data from two different channels for eNB 160 and RS 130, so that it is possible to provide the diversity effect and improve received quality.

Thus, if UE 2 detects from scheduling information from eNB 160 that MBMS data transmitted from eNB 160 is also transmitted from RS 130, that is, if UE 3 that is located in zone C receives the same MBMS service as in UE 2, UE 2 does not request a retransmission to eNB 160. By this means, in UE 2, even if packet error is present in MBMS data from eNB 160, it is possible to improve channel quality without requesting a retransmission of MBMS data. Therefore, it is possible to reduce radio resources required for a retransmission request.

Thus, according to the present embodiment, if error occurs in MBMS data transmitted from an eNB, this eNB determines an apparatus that performs retransmission, according to the received quality (CQI) of a UE, which requests a retransmission, to that eNB. Also, if there is a UE that cannot receive MBMS data via an RS, the eNB performs retransmission processing. That is, the UE can improve received quality by HARQ without relay transmission of MBMS data from the RS. Therefore, according to the present embodiment, it is possible to reduce radio resources to use in retransmission processing from an RS, so that, upon distributing MBMS via a radio access network formed with eNB's and RS's, it is possible to improve the received quality of MBMS data for UE's without wasting radio resources for retransmission.

Also, according to the present embodiment, if there is a UE that needs to receive MBMS service via an RS, a UE that is located in the cell coverage of the RS and that is located in the cell coverage of an eNB, does not request a retransmission even in a case where error occurs in MBMS data transmitted from the eNB. By this means, the UE can receive not only MBMS data from the eNB but also MBMS data from the RS without requesting a retransmission, and provide the diversity effect. Therefore, according to the present embodiment, it is possible to improve received quality without using radio resources for a retransmission request.

Also, the eNB according to the present embodiment employs a configuration having: a transmitting section that transmits MBMS data to a plurality of UE's and an RS; a scheduling information transmitting section that transmits scheduling information indicating radio resource allocation information of MBMS data transmitted by the subject apparatus or the RS; a receiving section that receives NACK signals including channel quality information indicating the channel quality between each of the plurality of UE's and the subject apparatus, from the plurality of UE's as a response signal; a retransmission determining section that determines whether the subject apparatus retransmits the MBMS data or the RS retransmits the MBMS data, based on the channel quality information; and a reporting section that reports a retransmission request for requesting the RS to relay the MBMS data, to the RS, when it is determined that the RS retransmits the MBMS data.

Also, the UE according to the present embodiment employs a configuration having: a receiving section that receives MBMS data from an eNB and RS; a scheduling information receiving section that receives scheduling information indicating radio resource allocation information of MBMS data transmitted by the eNB or the RS; a radio quality measuring section that measures the channel quality between the eNB and the subject apparatus, using a reference signal from the eNB, and generates channel quality information based on the measured channel quality; a detecting section that detects whether or not packet error is present in the MBMS data; and a transmitting section that does not transmit a NACK signal as a response signal if the scheduling information contains scheduling information of the RS, or transmits a NACK signal including the channel quality information as a response signal if the scheduling information does not contain the scheduling information of the RS, in a case where the packet error is detected.

Embodiment 2

In Embodiment 1, upon retransmission, the same MBMS data as in the initial transmission is retransmitted simply, without taking into account retransmitted MBMS data. Therefore, according to the received quality of MBMS data that is initially transmitted from an eNB, excessive radio resources may be allocated to retransmit MBMS data.

The present embodiment will be explained in detail below. In the following explanation, a data relay request transmitted from an eNB to an RS includes FEC coding rate designation information indicating the FEC coding rate of retransmission data.

Figure 9:
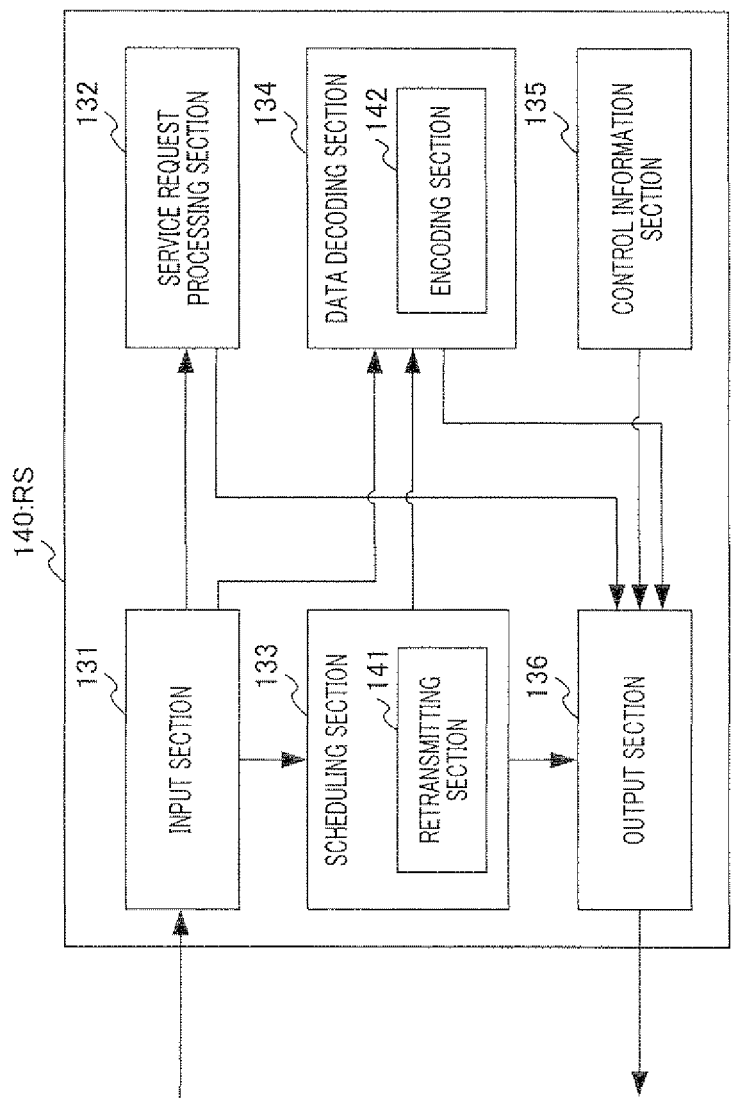
FIG. 9 is a block diagram showing the configuration of an RS according to Embodiment 2 of the present invention.

FIG. 9 is a block diagram showing the configuration of RS 140 according to the present embodiment. However, in FIG. 9, the same components as in FIG. 4 will be assigned the same reference numerals and their detailed explanation will be omitted.

Retransmitting section 141 of scheduling section 133 in RS 140 shown in FIG. 9 extracts the FEC coding rate of retransmission data from FEC coding rate designation information of retransmission data included in a data relay request received as input from input section 131, and reports the extracted FEC coding rate of retransmission data to encoding section 142 of data decoding section 134.

Encoding section 142 of data decoding section 134 performs FEC coding of stored MBMS data based on the FEC coding rate of retransmission data received as input from retransmitting section 141. Further, encoding section 142 outputs the MBMS data subjected to FEC coding to output section 136, according to scheduling information received as input from scheduling section 133.

Figure 10:
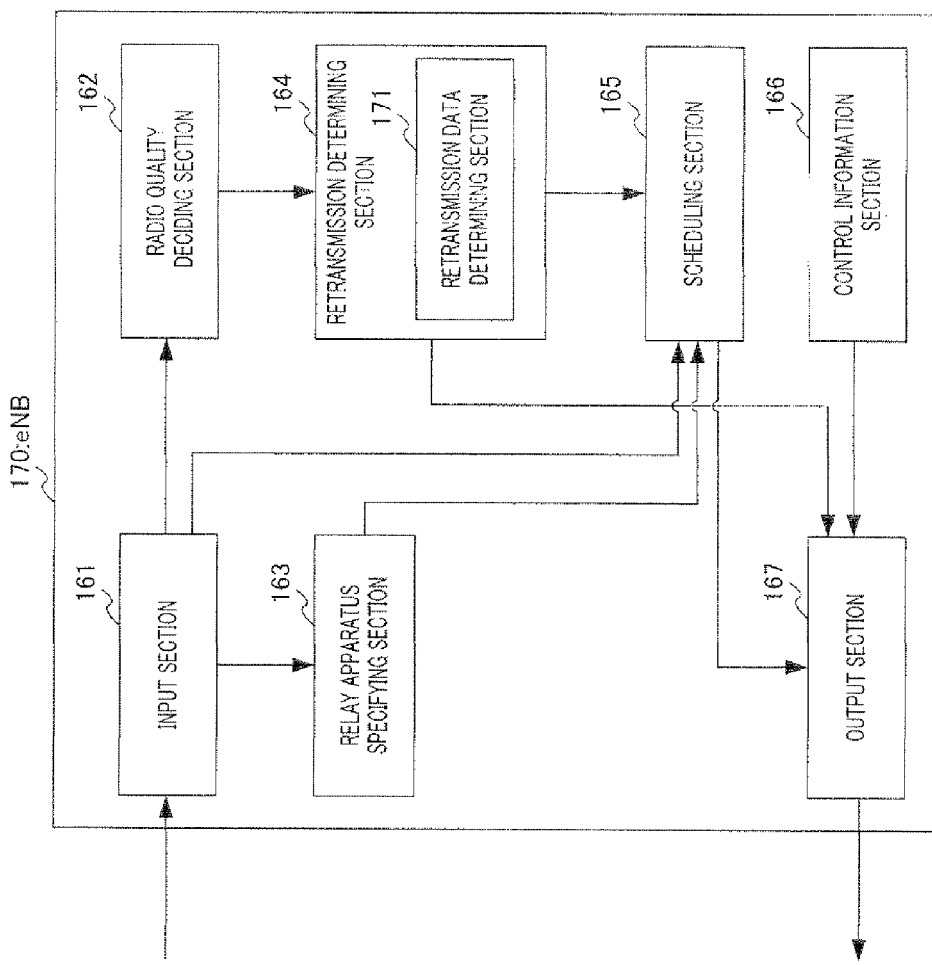
FIG. 10 is a block diagram showing the configuration of an eNB according to Embodiment 2 of the present invention.

FIG. 10 is a block diagram showing the configuration of eNB 170 according to the present embodiment. Here, in FIG. 10, the same components as in FIG. 5 will be assigned the same reference numerals and their detailed explanation will be omitted.

Retransmission data determining section 171 of retransmission determining section 164 in eNB 170 shown in FIG. 10 determines the FEC coding rates of MBMS data retransmitted from the subject apparatus and MBMS data retransmitted from RS 140, based on received quality decision information received as input from radio quality deciding section 162, that is, based on a CQI included in a NACK signal transmitted from each UE. Here, if UE 100 that can communicate with the subject apparatus and cannot communicate with RS 140 is detected from the received quality decision information, retransmission determining section 164 determines retransmission data of MBMS data based on the CQI from that UE 100. Also, if UE 100 that can communicate with RS 140 is detected from the received quality decision information, retransmission determining section 164 determines retransmission data (i.e. FEC coding rate) based on the CQI from that UE 100. That is, based on the CQI's from UE's 100 that are the retransmission targets of MBMS data retransmitted from the subject apparatus and MBMS data retransmitted from RS 140, retransmission data determining section 171 determines retransmission data respectively.

Here, if MBMS data is subjected to FEC coding, encoded data comprised of an information code part (i.e. systematic bits) which represents the MBMS data itself and a redundant code part (i.e. parity bits), is provided. Here, if the CQI transmitted from UE 100 is lower than a predetermined threshold, there is a high possibility that most of MBMS data (i.e. information code part) upon the initial transmission is not received, and therefore retransmission data determining section 171 determines the information code part which represents the MBMS data itself as retransmission data for that UE 100. By contrast, if the CQI transmitted from UE 100 is equal to or higher than a predetermined threshold, there is a high possibility that most of MBMS data (i.e. information code part) upon the initial transmission is received, and therefore retransmission data determining section 171 determines the redundant code part of the MBMS data as retransmission data for that UE 100. That is, retransmission data determining section 171 determines the same FEC coding rate as in the initial transmission when the CQI is equal to or lower than a predetermined threshold, or determines the FEC coding rate lower than in the initial transmission when the CQI is equal to or higher than the predetermined threshold.

Also, in a case where the CQI from UE 100 is equal to or higher than a predetermined threshold, when this CQI is higher, retransmission data determining section 171 determines the redundant code part of a shorter data length as retransmission data to be retransmitted. That is, in a case where the CQI from UE 100 is equal to or higher than a predetermined threshold, when this CQI is higher, retransmission data determining section 171 increases the FEC coding rate of retransmission MBMS data.

Further, retransmission date determining section 171 outputs the FEC coding rate of retransmission data retransmitted from the subject apparatus, to scheduling section 165. Also, to report FEC coding rate designation information indicating the FEC coding rate of retransmission data retransmitted from RS 140, to RS 140, retransmission data determining section 171 outputs a data relay request including the FEC coding rate designation information to output section 167.

Next, the MBMS data retransmission method according to the present embodiment for UE 1 that is located in zone A and UE 2 that is located in zone B, will be explained.

Figure 11:
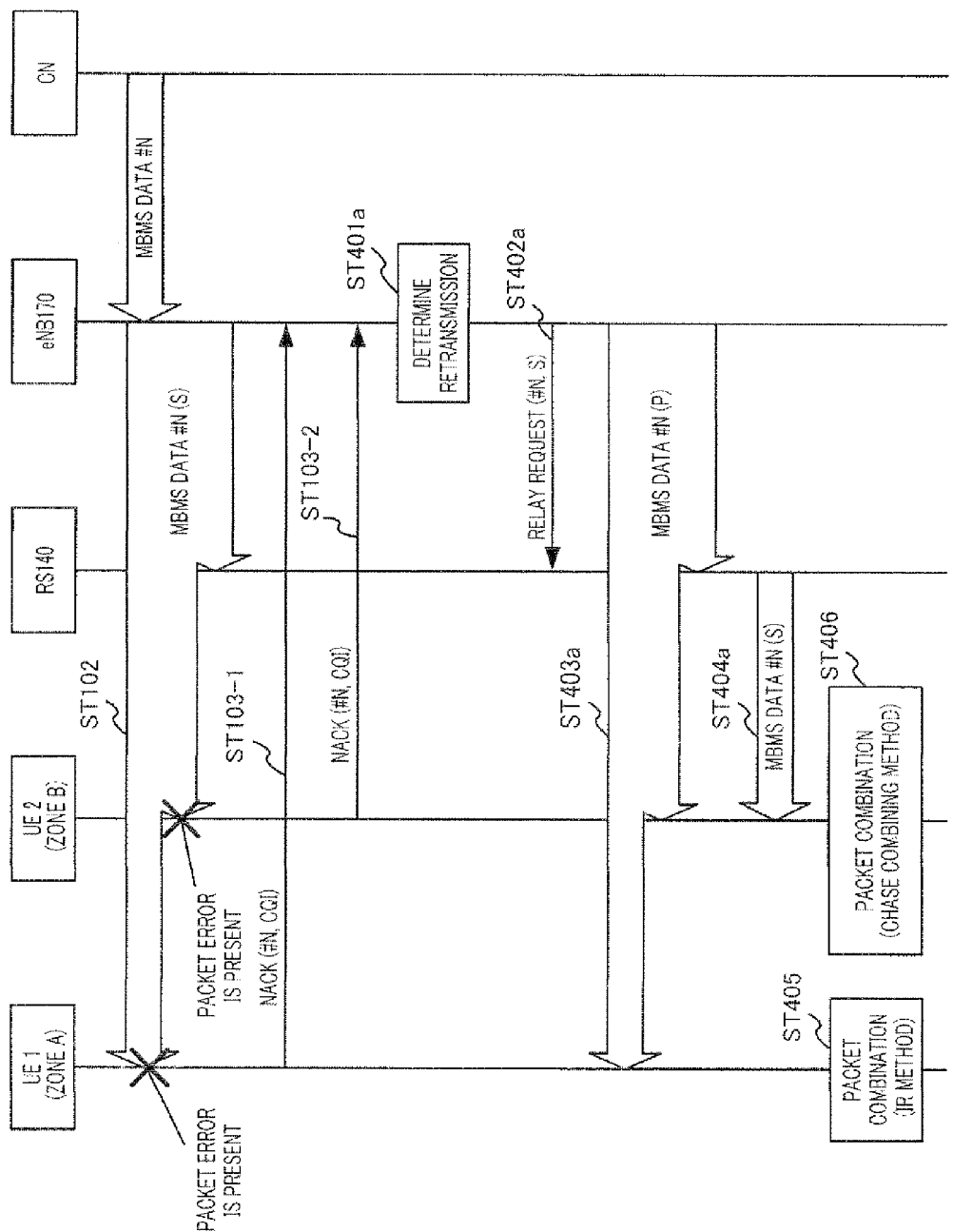
FIG. 11 is a sequence diagram showing retransmission processing according to Embodiment 2 of the present invention (retransmission example 1)

FIG. 11 is a sequence diagram showing a retransmission method in a case where the CQI from UE 1 that is located in zone A is equal to or higher than a predetermined threshold and the CQI from UE 2 that is located in zone B is lower than the predetermined threshold. Here, in FIG. 11, the same components as in FIG. 7 will be assigned the same reference numerals and their explanation will be omitted.

In ST 401*a* shown in FIG. 11, eNB 170 detects UE 1 that is located in zone A and UE 2 that is located in zone B, from the CQI's included in respective NACK signals in ST 103-1 and ST 103-2. Further, eNB 170 determines the FEC coding rate of MBMS data retransmitted by the subject apparatus (i.e. retransmission data) based on the CQI from UE 1, and determines the FEC coding rate of MBMS data retransmitted by RS 140 (i.e. retransmission data) based on the CQI from UE 2. That is, the CQI from UE 1 that is located in zone A is equal to or higher than a predetermined threshold, and therefore eNB 170 applies puncturing processing to MBMS data #N and determines a redundant code part (MBMS data #N(P)) as retransmission data to be retransmitted by the subject apparatus. Also, the CQI from UE 2 that is located in zone B is lower than the predetermined threshold, and therefore eNB 170 determines an information code part (MBMS data #N(S)) which represents MBMS data #N itself, as retransmission data to be retransmitted by RS 140. That is, eNB 170 makes the FEC coding rate of retransmission data retransmitted from the subject apparatus lower than in the initial transmission, and makes the FEC coding rate of retransmission data retransmitted from RS 140 the same as in the initial transmission.

In ST 402*a*, eNB 170 transmits a relay request (#N, S) for requesting a retransmission relay of MBMS data #N(S), to RS 140.

In ST 403*a*, eNB 170 retransmits MBMS data #N(P). In ST 404*a*, RS 140 retransmits the same MBMS data #N(S) as MBMS data #N stored in a buffer in ST 102 (i.e. MBMS data initially transmitted from eNB 170).

In ST 405, UE 1 performs packet combination of MBMS data #N(S) received from eNB 170 in ST 102 and MBMS data #N(P) retransmitted from eNB 170 in ST 403*a*. That is, according to the IR method combining MBMS data #N(S) in ST 102 and MBMS data #N(P) in ST 403*a*, UE 1 performs error correction at a lower FEC coding rate than in the initial transmission and compensates packet error.

On the other hand, in ST 406, UE 2 performs packet combination of MBMS data #N(S) received from eNB 170 in ST 102 and MBMS data #N(S) retransmitted from RS 140 in ST 404*a*. That is, according to the chase combining method combining MBMS data #N(S) in ST 102 and MBMS data #N(S) in ST 403*a*, UE 2 performs error correction at the same FEC coding rate as in the initial transmission and compensates packet error.

By this means, while an information code part which represents MBMS data itself is retransmitted to UE 2 that is located in zone B in which the CQI is lower than a predetermined threshold, a redundant code part of the MBMS data is retransmitted to UE 1 that is located in zone A in which the CQI is equal to or higher than the predetermined threshold. That is, only retransmission data of a smaller data amount is retransmitted to a UE that is located in a zone in which the CQI is equal to or higher than a predetermined threshold, so that it is possible to reduce radio resources to use in retransmission.

Figure 12:
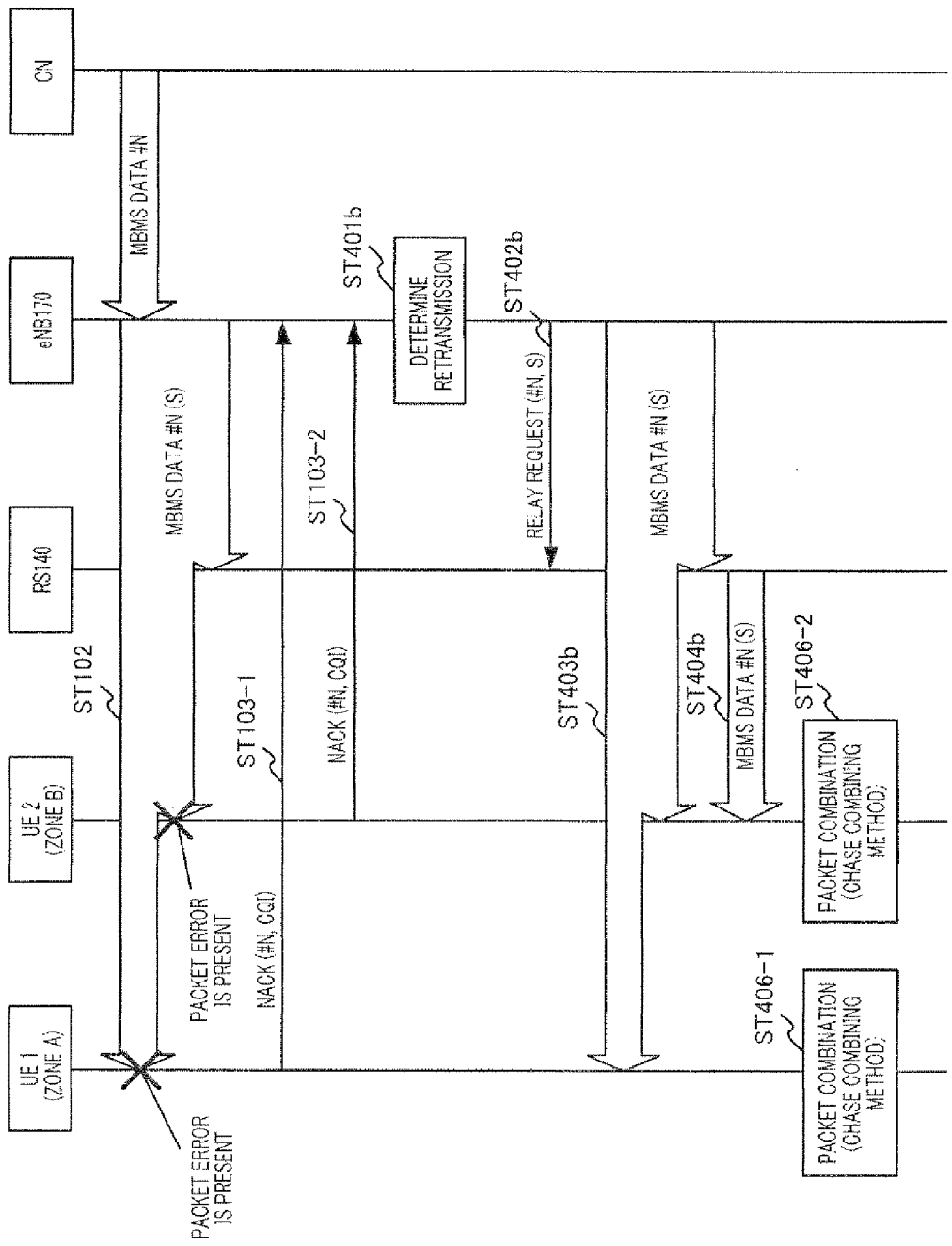
FIG. 12 is a sequence diagram showing retransmission processing according to Embodiment 2 of the present invention (retransmission example 2)

Next, FIG. 12 is a sequence diagram showing the retransmission method in a case where the CQI from UE 1 that is located in zone A and the CQI from UE 2 that is located in zone B are both lower than a predetermined threshold. Here, in FIG. 12, the same components as in FIG. 11 will be assigned the same reference numerals and their explanation will be omitted.

In ST 401*b* shown in FIG. 12, similar to FIG. 11, eNB 170 determines the FEC coding rates of MBMS data to be retransmitted by the subject apparatus and RS 140. That is, the CQI from UE 1 that is located in zone A is lower than a predetermined threshold, and therefore eNB 170 determines MBMS data #N(S) as retransmission data to be retransmitted by the subject apparatus. Also, the CQI from UE 2 that is located in zone B is lower than a predetermined threshold, and therefore eNB 170 determines MBMS data #N(S) as retransmission data to be retransmitted by RS 140. That is, eNB 170 makes the FEC coding rate of retransmission data retransmitted from the subject apparatus and the FEC coding rate of retransmission data retransmitted from RS 140, the same as in the initial transmission.

In ST 402*b*, eNB 170 transmits a relay request (#N, S) for requesting a relay of MBMS data #N(S), to RS 140. In ST 403*b*, eNB 170 retransmits MBMS data #N(S). In ST 404*b*, RS 140 retransmits MBMS data #N(S).

In ST 406-1, with the chase combining method, UE 1 performs packet combination of MBMS data #N(S) received from eNB 170 in ST 102 and MBMS data #N(S) retransmitted from eNB 170 in ST 403*b*.

In ST 406-2, with the chase combining method, UE 2 performs packet combination of MBMS data #N(S) received from eNB 170 in ST 102, MBMS data #N(S) retransmitted from eNB 170 in ST 403*b* and MBMS data #N(S) retransmitted from RS 140 in ST 400.

By this means, if the CQI from UE 1 that is located in zone A and the CQI from UE 2 that is located in zone B are both lower than a predetermined threshold, an information code part which represents MBMS data itself is retransmitted to UE 1 and UE 2. Therefore, UE 2 can use not only retransmission data from RS 140 but also retransmission data from eNB 170 for packet error compensation, so that it is possible to improve received quality.

Figure 13:
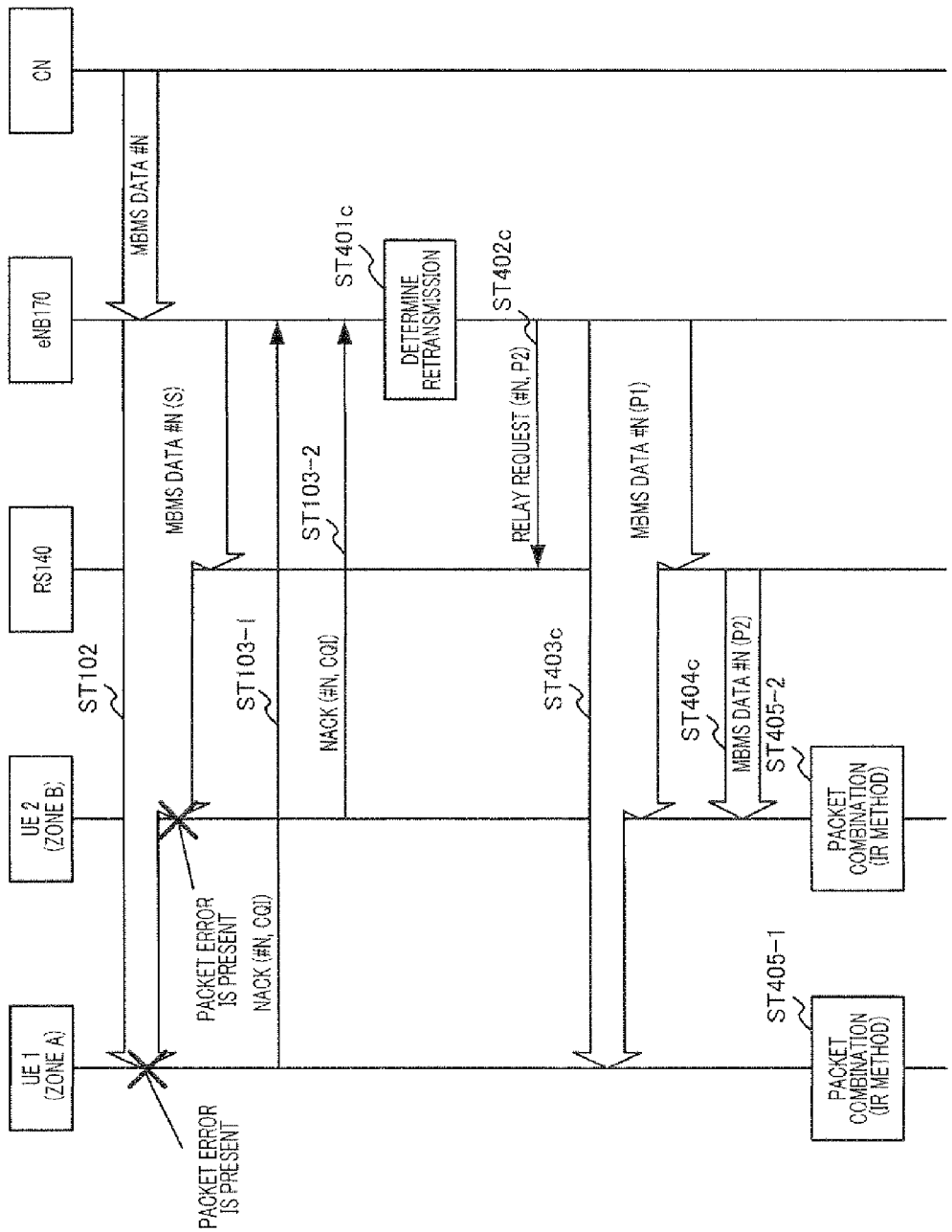
FIG. 13 is a sequence diagram showing retransmission processing according to Embodiment 2 of the present invention (retransmission example 3).

FIG. 13 is a sequence diagram showing the retransmission method in a case where UE 1 that is located in zone A and UE 2 that is located in zone B are both equal to or higher than a predetermined threshold. Also, a case will be explained where the CQI from UE 1 that is located in zone A is higher than the CQI from UE 2 that is located in zone B. Here, in FIG. 13, the same components as in FIG. 11 will be assigned the same reference numerals and their explanation will be omitted.

In ST 401*e* shown in FIG. 13, similar to FIG. 11, eNB 170 determines the FEC coding rates of MBMS data to be retransmitted by the subject apparatus and RS 140 (i.e. retransmission data). That is, the CQI from UE 1 that is located in zone A and the CQI from UE 2 that is located in zone B are both equal to or higher than a predetermined threshold, and therefore eNB 170 determines a redundant code part of MBMS data #N as retransmission data to be retransmitted by the subject apparatus and RS 140.

Here, there is a difference between the CQI from UE 1 that is located in zone A and the CQI from UE 2 that is located in zone B, and the FEC coding rate (i.e. the data amount in the redundant code part) required for error correction varies between the UE's for these CQI's. To be more specific, the CQI from UE 1 that is located in zone A is higher than the CQI from UE 2 that is located in zone B, and therefore UE 1 that is located in zone A requires error correction at a higher FEC coding rate (i.e. smaller data amount) than in UE 2 that is located in zone B. Therefore, eNB 170 makes the FEC coding rate of retransmission data to be retransmitted from the subject apparatus higher than the FEC coding rate of retransmission data to be retransmitted from RS 140. That is, eNB 170 makes the data length of the redundant code part (MBMS data #N(P1)) of MBMS data #N, which is retransmission data to be retransmitted from the subject apparatus, shorter than the data length of the redundant code part (MBMS data #N(P2)) of MBMS data #N, which is retransmission data to be retransmitted from RS 140.

In ST 402*c*, eNB 170 transmits a relay request (#N, P2) for requesting a relay of MBMS data #N(P2), to RS 140. In ST 403*c*, eNB 170 retransmits MBMS data #N(P1). In ST 404*c*, RS 140 retransmits MBMS data #N(P2) generated using MBMS(S) received from eNB 170 in ST 102 and an FEC coding rate included in the relay request transmitted from eNB 170 in ST 402*c*.

In ST 405-1, with the IR method, UE 1 performs packet combination of MBMS data #N(S) received from eNB 170 in ST 102 and MBMS data #N(P1) retransmitted from eNB 170 in ST 403*c*.

In ST 405-2, with the IR method, UE 2 performs packet combination of MBMS data #N(S) received from eNB 170 in ST 102, MBMS data #N(P1) retransmitted from eNB 170 in ST 403*c* and MBMS data #N(P2) retransmitted from RS 140 in ST 404*c*.

Thus, only minimum retransmission data required for packet error compensation is retransmitted in association with the UE that is located in each zone, so that it is possible to minimize radio resources to use in retransmission. Also, similar to FIG. 12, UE 2 can use not only retransmission data from RS 140 but also retransmission data from eNB 170 for packet error compensation, so that it is possible to further improve received quality.

Thus, according to the present embodiment, an eNB determines the FEC coding rate of retransmission data in an apparatus that retransmits MBMS data (i.e. in the eNB or RS), according to received quality (i.e. CQI's) from a plurality of UE's. By this means, each UE can receive retransmission data of a data length required for error correction, so that it is possible to improve received quality without allocating extra radio resources in retransmission.

Embodiments of the present invention have been described above.

Although example cases have been described with the above embodiments where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-029400, filed on Feb. 8, 2008, including the specification, drawings and abstract, is incorporated herein by reference in its entirety.

INDUSTRIAL APPLICABILITY

The present invention is applicable to a mobile communication system, for example.

The invention claimed is:

1. A radio communication terminal apparatus comprising:
   a receiving section that receives first scheduling information indicating a radio resource of a first multimedia broadcast/multicast service (MBMS) data from a radio communication base station apparatus, and receives the first MBMS data based on the first scheduling information;
   a radio quality measuring section that measures channel quality between the radio communication base station apparatus and the radio communication terminal apparatus, using a reference signal from the radio communication base station apparatus, and generates channel quality information (CQI) based on the measured channel quality;
   a detecting section that detects whether or not an error is present in the first MBMS data; and
   a transmitting section that determines whether or not to transmit a negative acknowledgement (NACK) signal including the CQI as a response signal; wherein:
   when the error is detected,
   the transmitting section does not transmit the response signal in the event that second scheduling information is received from a radio communication relay apparatus that can communicate with the radio communication terminal apparatus, the second scheduling information indicating a radio resource of second MBMS data transmitted from the radio communication relay apparatus, the transmitting section transmits the response signal in the event that the second scheduling information is not received from the radio communication relay apparatus, and the receiving section receives, in the event that the second scheduling information is received, the second MBMS data from the radio communication relay apparatus based on the second scheduling information, and receives, in the event that the second scheduling information is not received, retransmission data retransmitted from the radio communication base station apparatus or the radio communication relay apparatus.

2. A radio communication system comprising a radio communication base station apparatus, radio communication relay apparatus and radio communication terminal apparatus, wherein:

the radio communication base station apparatus comprises:

a first transmitting section that transmits multimedia broadcast/multicast service (MBMS) data to a plurality of radio communication terminal apparatuses and a radio communication relay apparatus;

a first receiving section that receives a negative acknowledgement (NACK) signal a determining section that selects, as a specific apparatus that retransmits retransmission data, either the radio communication base station apparatus or the radio communication relay apparatus such that all radio communication terminal apparatuses receive, from the selected specific apparatus, the same MBMS data with a received quality equal to or higher than a predetermined threshold, the all radio communication terminal apparatuses including a radio communication terminal apparatus that transmits the NACK signal among the plurality of radio communication terminal apparatuses;

a second transmitting section that transmits first retransmission data retransmitted from the radio communication base station apparatus, in the event that the selected specific apparatus is the radio communication base station apparatus; and a reporting section that reports, to the radio communication relay apparatus, a retransmission request for transmitting, to the plurality of radio communication terminal apparatuses, the second retransmission data retransmitted from the radio communication relay apparatus, in the event that the selected specific apparatus is the radio communication relay apparatus;

the radio communication relay apparatus comprises:

a relay section that relays the MBMS data received from the radio communication base station apparatus, to the radio communication terminal apparatus;

a storage section that stores the MBMS data in a buffer;

an encoding section that encodes the MBMS data when the retransmission request of the MBMS data is reported from the radio communication base station apparatus, the MBMS data; and a retransmitting section that retransmits the encoded MBMS data to the radio communication terminal apparatus; and the radio communication terminal apparatus comprises:

a second receiving section that receives first scheduling information indicating a radio resource of a first MBMS data from the radio communication base station apparatus, and receives the first MBMS data based on the first scheduling information;

a radio quality measuring section that measures channel quality between the radio communication base station apparatus and the radio communication terminal apparatus, using a reference signal from the radio communication base station apparatus, and generates channel quality information (CQI) based on the measured channel quality;

a detecting section that detects whether or not an error is present in the first MBMS data; and a third transmitting section that determines whether or not to transmit the NACK signal including the CQI as a response signal; wherein:

when the error is detected, the third transmitting section does not transmit the response signal in the event that second scheduling information is received from a radio communication relay apparatus that can communicate with the radio communication terminal apparatus, the second scheduling information indicating a radio resource of second MBMS data transmitted from the radio communication relay apparatus, the third transmitting section transmits the response signal in the event that the second scheduling information is not received from the radio communication relay apparatus, and the second receiving section receives, in the event that the second scheduling information is received, the second MBMS data from the radio communication relay apparatus based on the second scheduling information, and receives, in the event that the second scheduling information is not received, retransmission data retransmitted from the radio communication base station apparatus or the radio communication relay apparatus.

3. A method for transmitting a response signal comprising:

receiving first scheduling information indicating a radio resource of a first multimedia broadcast/multicast service (MBMS) data from a radio communication base station apparatus, and receiving the first MBMS data based on the first scheduling information;

measuring channel quality between the radio communication base station apparatus and the radio communication terminal apparatus, using a reference signal from the radio communication base station apparatus, and generating channel quality information based on the measured channel quality;

detecting whether or not an error is present in the first MBMS data; and determining whether or not to transmit a negative acknowledgement signal including the channel quality information as the response signal; wherein:

when the error is detected, in determining whether or not to transmit the response signal, not transmitting the response signal in the event that second scheduling information is received from a radio communication relay apparatus that can communicate with the radio communication terminal apparatus, the second scheduling information indicating a radio resource of second MBMS data transmitted from the radio communication relay apparatus, and transmitting the response signal in the event that the second scheduling information is not received from the radio communication relay apparatus, and receiving, in the event that the second scheduling information is received, the second MBMS data from the radio communication relay apparatus based on the second scheduling information, and receiving, in the event that the second scheduling information is not received, retransmission data retransmitted from the radio communication base station apparatus or the radio communication relay apparatus.

* * * * *